(12) United States Patent
Liu et al.

(10) Patent No.: US 8,761,244 B2
(45) Date of Patent: Jun. 24, 2014

(54) METHOD AND SYSTEM FOR MEDIA FILE COMPRESSION

(75) Inventors: Jun Liu, Shenzhen (CN); Jingchang Chen, Shenzhen (CN); Xinliang Wang, Shenzhen (CN)

(73) Assignee: Tencent Technology (Shenzhen) Company Limited, Shenzen (CN)

( * ) Notice: Subject to any disclaimer, the term of this patent is extended or adjusted under 35 U.S.C. 154(b) by 112 days.

(21) Appl. No.: 13/500,883

(22) PCT Filed: Jun. 28, 2010

(86) PCT No.: PCT/CN2010/074646
§ 371 (c)(1),
(2), (4) Date: Apr. 6, 2012

(87) PCT Pub. No.: WO2011/054208
PCT Pub. Date: May 12, 2011

(65) Prior Publication Data
US 2012/0201290 A1    Aug. 9, 2012

(30) Foreign Application Priority Data

Nov. 4, 2009    (CN) .......................... 2009 1 0209496

(51) Int. Cl.
*H04N 7/12*     (2006.01)
*H04N 7/50*     (2006.01)
*H04N 7/26*     (2006.01)

(52) U.S. Cl.
CPC .............. *H04N 7/50* (2013.01); *H04N 7/26271* (2013.01); *H04N 7/26244* (2013.01); *H04N 7/26335* (2013.01); *H04N 7/26941* (2013.01)
USPC ............ 375/240.01; 375/240.24; 375/240.25; 375/240.26; 375/240.28; 375/240.27; 382/233; 382/235; 382/239; 382/232

(58) Field of Classification Search
CPC . H04N 7/50; H04N 7/26271; H04N 7/26244; H04N 7/26335; H04N 7/26941
USPC ............ 375/240.01, 240.24, 240.25, 240.26, 375/240.28, 240.27; 382/233, 235, 239, 382/232
See application file for complete search history.

(56) References Cited

U.S. PATENT DOCUMENTS

| 7,949,043 B2* | 5/2011 | Ing et al. .................. 375/240.03 |
| 2004/0045030 A1 | 3/2004 | Reynolds et al. |

(Continued)

FOREIGN PATENT DOCUMENTS

| CN | 1941875 | 4/2007 |
| CN | 1941875 A | 4/2007 |

(Continued)

OTHER PUBLICATIONS

Written Opinion issued in Singapore Patent Application No. 201202680-3 dated Nov. 7, 2012.

(Continued)

*Primary Examiner* — Shawn An
(74) *Attorney, Agent, or Firm* — McDermott Will & Emery LLP

(57) ABSTRACT

The present invention discloses a method for media file compression, which includes: extracting the encoding parameters from an input media file, separating and decoding the audio and video stream from the input media file, and extracting an original audio stream and an original video stream; computing the transcoding parameters required for compression according to the encoding parameters; encoding the original audio stream to output a new compressed audio stream, and encoding the original video stream to output a new compressed video stream according to the transcoding parameters; synthesizing the new compressed audio stream and the new compressed video stream to create a new media file. The present invention also provides a system for media file compression. By means of the method and system of the present invention, users can realize simple and rapid compression for media files of various formats without understanding media expertise, and the storage space can be saved, so that it is convenient to carry, transfer and share the media files.

5 Claims, 2 Drawing Sheets

(56) References Cited

U.S. PATENT DOCUMENTS

2006/0167987 A1* 7/2006 Yamane .................. 709/203
2007/0071097 A1  3/2007 Koto
2008/0130737 A1* 6/2008 Kamariotis et al. ..... 375/240.01

FOREIGN PATENT DOCUMENTS

| | | |
|---|---|---|
| CN | 101098483 | 1/2008 |
| CN | 101404767 A | 4/2009 |
| EP | 1587327 A2 | 10/2005 |
| JP | 2003-256253 | 9/2003 |
| KR | 10-2009-0029635 | 3/2009 |

OTHER PUBLICATIONS

Office Action issued in Chinese Application No. 2012040900833880 dated Apr. 12, 2012.

* cited by examiner

US 8,761,244 B2

METHOD AND SYSTEM FOR MEDIA FILE COMPRESSION

RELATED APPLICATIONS

This application is the U.S. National Phase under 35 U.S.C. §371 of International Application No. PCT/CN2010/074646, filed on Jun. 28, 2010, which in turn claims the benefit of Chinese Application No. 200910209496.2, filed on Nov. 4, 2009, the disclosures of which Applications are incorporated by reference herein.

FIELD OF THE INVENTION

The present invention relates to the technology of media file compression, and particularly, to a method and a system for media file compression.

BACKGROUND OF THE INVENTION

Nowadays, with the popularization of the digital products, more and more users shoot the videos through Digital Videos (DV) or cameras with the video function. But the media file created in this way has an obvious disadvantage that the file usually has a large size and occupies a bulky disk space. For example, the file obtained by shooting with the common DV for one hour may be 2G or more. Thus for the user's convenience of storing such large video file, a utility tool is required to help the user to compress the file while maintaining the subjective quality of the video.

During the creation of the media file, the most critical operation is the audio and video (AV) encoding. There are various AV encoding standards to meet different business demands. For example, the H.263 standard for video telephone and video conference, the Moving Picture Experts Group2 (MPEG2) standard for Digital Video Broadcasting (DVB), high definition television (HDTV) and Digital Video Disc (DVD), the MPEG4 standard for the stream media service in the network, and the H.264 standard that provides a high video compression performance.

Due to the existence of various encoding standards, the media files owned by the user have different file formats and AV encoding formats. In order to compress a file, a file parse and an AV decoding shall be carried out firstly; and after the original AV streams are obtained, appropriate AV transcoders and transcoding parameters shall be selected to create a new media file with a smaller size. Thus when a media file is to be compressed, the format information of the media file shall be analyzed at first, and then the transcoding parameters shall be determined according the efficiency of the encoder and the encoding parameters used for the source file. The current video compression tool usually requires the user to understand the media expertise deeply and set appropriate transcoding parameters, so as to achieve a good compression effect. However, for an ordinary and popular user, it is difficult to use such kind of video compression tool, thus a simple and rapid compression method and utility tool are required to meet the compression demand.

SUMMARY OF THE INVENTION

For the above reason, the major object of the present invention is to provide a method and a system for media file compression, so as to realize simple and rapid compressions of different formats of media files.

In order to achieve the above object, the technical solutions of the present invention are provided as follows:

The present invention provides a method for media file compression, comprising:

extracting encoding parameters from an input media file, separating and decoding audio and video streams from the input media file, and extracting an original audio stream and an original video stream;

computing transcoding parameters required for a compression according to the encoding parameters;

encoding the original audio stream to output a new compressed audio stream, and encoding the original video stream to output a new compressed video stream, according to the transcoding parameters; and synthesizing the new compressed audio stream and the new compressed video stream to create a new media file.

The encoding parameter comprises video encoding parameter and audio encoding parameter, wherein the video encoding parameter comprises original video encoder type, original video encoding bit rate, original video encoding frame rate, and original video resolution; and the audio encoding parameter comprises original audio encoder type, original audio encoding bit rate, original audio channel number, and original audio sample rate;

the transcoding parameter comprises video transcoding parameter and audio transcoding parameter, wherein the video transcoding parameter comprises target video encoder type, target video encoding bit rate, target video encoding frame rate, and target video resolution; and the audio transcoding parameter comprises target audio encoder type, target audio encoding bit rate, target audio channel number, and target audio sample rate.

The method further comprises computing the target video encoding frame rate required for the compression according to the following principle:

comparing the original video encoding frame rate with a predetermined threshold value of the video encoding frame rate; if the original video encoding frame rate is larger than or equal to the threshold value, determining the target video encoding frame rate to be equal to the threshold value; and if the original video encoding frame rate is smaller than the threshold value, determining the target video encoding frame rate to be the same as the original video encoding frame rate.

The method further comprises computing the target video resolution required for the compression according to the following principle:

comparing the original video resolution with a predetermined threshold value of the video resolution; if the original video resolution is not higher than the threshold value, determining the target video resolution to be the same as the original video resolution; and if the original video resolution is higher than the threshold value, decreasing the resolution, and zooming toward the threshold value while maintaining an original picture aspect ratio, so as to obtain the target video resolution.

The method further comprises computing the target video encoder type required for the compression according to the following principle:

when the original video encoder type is Real Media (RM), VC1 or H264, determining the target video encoder type to be H.264, otherwise determining the target video encoder type to be Moving Picture Experts Group 4 (MPEG4).

The method further comprises computing the target video encoding bit rate required for the compression according to the following principle:

computing a ratio K_fps between the target video encoding frame rate and the original video encoding frame rate, computing a ratio K_pix between the target video resolution and the original video resolution, and obtaining an alternative target video encoding bit rate in an equation of $K\_fps \cdot K\_pix \cdot K\_br \cdot$ original video encoding bit rate, wherein K_br represents a predetermined target bit rate decreasing coefficient;

selecting a most approximate reference resolution from a predetermined reference correspondence table according to the target video resolution, comparing a reference bit rate corresponding to the selected reference resolution with the alternative target video encoding bit rate, and selecting the smaller bit rate as the target video encoding bit rate required for the compression.

The method further comprises computing the audio transcoding parameter required for the compression according to the following principle:

determining that the target audio sample rate is the same as the original audio sample rate, and the target audio channel number is the same as the original audio channel number; determining that the target audio encoder type is Advanced Audio Coding (AAC);

computing a ratio between the original audio encoding bit rate and the original video encoding bit rate, and judging whether the ratio is larger than a predetermined threshold value; and if yes, lowering the target audio encoding bit rate by one or two levels; otherwise determining the target audio encoding bit rate to be the same as the original audio encoding bit rate.

The present invention further provides a system for media file compression, comprising:

a media information extraction module configured to extract encoding parameters from an input media file;

a transcoding parameter computation module configured to compute transcoding parameters required for a compression according to the encoding parameters;

an audio and video stream separation module configured to separate audio and video streams from the input media file to obtain an audio compressed stream and a video compressed stream;

an audio decoding module configured to decode the separated audio compressed stream to extract an original audio stream;

a video decoding module configured to decode the separated video compressed stream to extract an original video stream;

an audio encoding module configured to encode the original audio stream according to the transcoding parameters to output a new compressed audio stream;

a video encoding module configured to encode the original video stream according to the transcoding parameters to output a new compressed video stream; and an audio and video streams synthesis module configured to synthesize the new compressed audio stream with the new compressed video stream to create a new media file.

The encoding parameter comprises video encoding parameter and audio encoding parameter, wherein the video encoding parameter comprises original video encoder type, original video encoding bit rate, original video encoding frame rate, and original video resolution; and the audio encoding parameter comprises original audio encoder type, original audio encoding bit rate, original audio channel number, and original audio sample rate;

the transcoding parameter comprises video transcoding parameter and audio transcoding parameter, wherein the video transcoding parameter comprises target video encoder type, target video encoding bit rate, target video encoding frame rate, and target video resolution; and the audio transcoding parameter comprises target audio encoder type, target audio encoding bit rate, target audio channel number, and target audio sample rate.

The transcoding parameter computation module is further configured to compute the target video encoding frame rate required for the compression according to the following principle:

comparing the original video encoding frame rate with a predetermined threshold value of the video encoding frame rate; if the original video encoding frame rate is larger than or equal to the threshold value, determining the target video encoding frame rate to be equal to the threshold value; and if the original video encoding frame rate is smaller than the threshold value, determining the target video encoding frame rate to be the same as the original video encoding frame rate.

The transcoding parameter computation module is further configured to compute the target video resolution required for the compression according to the following principle:

comparing the original video resolution with a predetermined threshold value of the video resolution; if the original video resolution is not higher than the threshold value, determining the target video resolution to be the same as the original video resolution; and if the original video resolution is higher than the threshold value, decreasing the resolution, and zooming toward the threshold value while maintaining an original picture aspect ratio, so as to obtain the target video resolution.

The transcoding parameter computation module is further configured to compute the target video encoding bit rate required for the compression according to the following principle:

computing a ratio K_fps between the target video encoding frame rate and the original video encoding frame rate, computing a ratio K_pix between the target video resolution and the original video resolution, and obtaining an alternative target video encoding bit rate in an equation of $K\_fps \cdot K\_pix \cdot K\_br \cdot$ original video encoding bit rate, wherein K_br represents a predetermined target bit rate decreasing coefficient;

selecting a most approximate reference resolution from a predetermined reference correspondence table according to the target video resolution, comparing a reference bit rate corresponding to the selected reference resolution with the alternative target video encoding bit rate, and selecting the smaller bit rate as the target video encoding bit rate required for the compression.

The method and system for media file compression according to the present invention extract the encoding parameters from the input media file, separate and decode the audio and video stream from the input media file, and extract an original audio stream and an original video stream; compute the transcoding parameters required for compression according to the encoding parameters; encode the original audio stream to output a new compressed audio stream, and encode the original video stream to output a new compressed video stream according to the transcoding parameters; synthesize the new compressed audio stream and the new compressed video stream to create a new media file. By means of the present invention, users can realize simple and rapid compressions of the media files of various formats without understanding media expertise, and the storage space can be saved, so that it is convenient to carry, transfer and share the media files. In addition, by means of the compression provided by the present invention, the subjective quality of the media files can also be ensured.

DETAILED DESCRIPTION OF THE PREFERRED EMBODIMENTS

The technical solutions of the present invention are detailedly described as follows with reference to the embodiments and the drawings.

Figure 1:
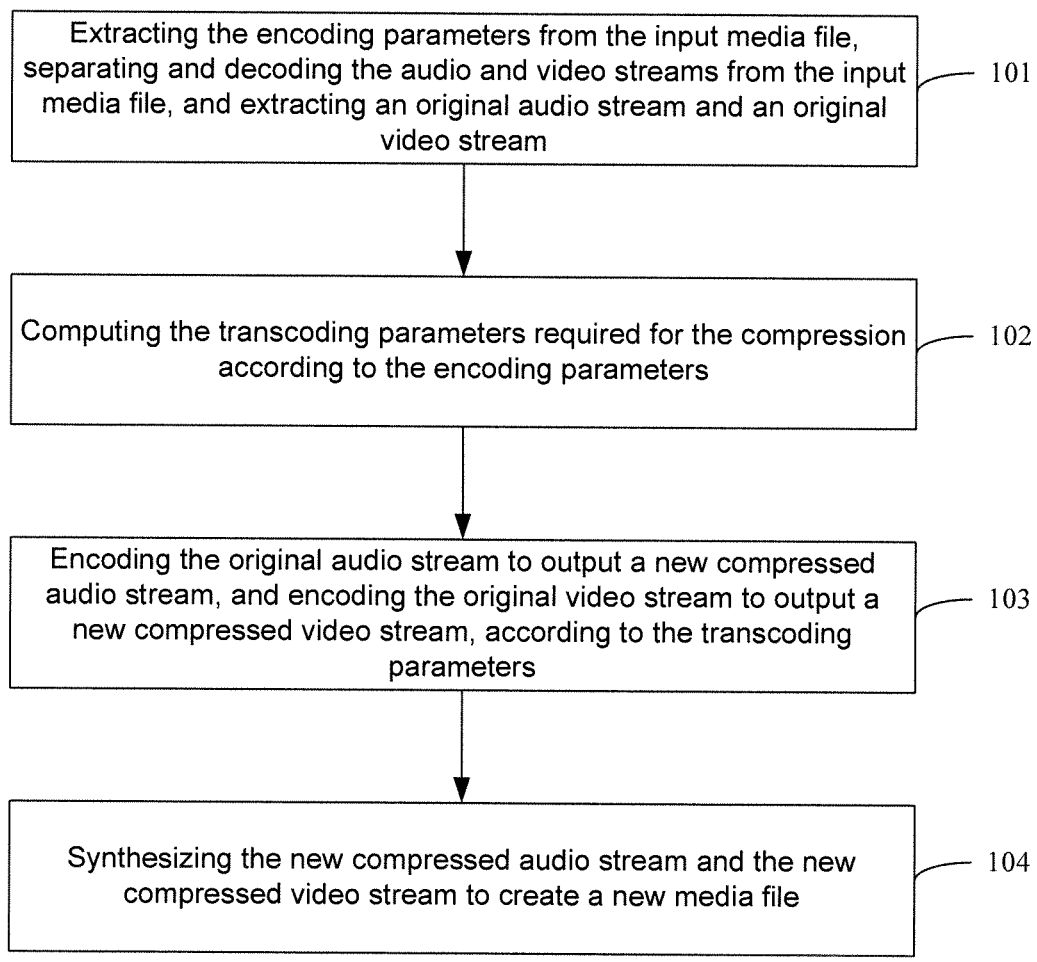
FIG. 1 is a flowchart of a method for media file compression according to the present invention.

The method for media file compression provided by the present invention is implemented by the system for media file compression provided by the present invention. Firstly, the compression method of the present invention is described as follows. As illustrated in FIG. 1, the compression method mainly includes:

Step 101: extracting the encoding parameters from the input media file, separating and decoding the audio and video streams from the input media file to obtain an original audio stream and an original video stream.

The user specifies a media file and inputs it into the compression system of the present invention. The media file usually can be inputted as follows, but not limited thereto: playing a certain media file in the media player, right clicking the mouse to invoke the menu and initiate a compression instruction for the media file, thereby inputting the media file into the compression system of the present invention.

The encoding parameter in the present invention includes the video encoding parameter and the audio encoding parameter. In which, the video encoding parameter includes the original video encoder type (Src_VideoCodec), the original video encoding bit rate (Src_VideoBitrate), the original video encoding frame rate (Src_VideoFps), and the original video resolution (Src_Resolution). The audio encoding parameter includes the original audio encoder type (Src_AudioCodec), the original audio encoding bit rate (Src_AudioBitrate), the original audio channel number (Src_AudioChannel), and the original audio sample rate (Src_AudioSamplerate).

In addition, the audio and video streams shall be separated and decoded from the input media file. Firstly, the original audio compressed stream and video compressed stream are obtained by separating the audio and video streams, i.e., the audio compressed stream and the video compressed stream can be identified according to file description information in the media file, so as to obtain the original audio compressed stream and video compressed stream by separating the media file. Next, the original audio compressed stream and video compressed stream are respectively decoded (or decompressed) to obtain the decoded original audio stream and original video stream.

Step 102: computing the transcoding parameters required for the compression according to the encoding parameters.

The transcoding parameter in the present invention includes the video transcoding parameter and the audio transcoding parameter. In which, the video transcoding parameter includes the target video encoder type (Dst_VideoCodec), the target video encoding bit rate (Dst_VideoBitrate), the target video encoding frame rate (Dst_VideoFps), and the target video resolution (Dst_Resolution). The audio transcoding parameter includes the target audio encoder type (Dst_AudioCodec), the target audio encoding bit rate (Dst_AudioBitrate), the target audio channel number (Dst_AudioChannel), and the target audio sample rate (Dst_AudioSamplerate).

The target video encoding bit rate required for the compression shall be computed according to the following principles:

A. computing a ratio between the target video encoding frame rate and the original video encoding frame rate, i.e., K_fps=target video encoding frame rate/original video encoding frame rate;

B. computing a ratio between the target video resolution and the original video resolution, i.e., K_pix=target video resolution/original video resolution;

C. predetermining a target bit rate decreasing coefficient K_br, which is adjustable according to the actual test result, e.g., predetermining K_br=0.7;

D. obtaining an alternative target video encoding bit rate, i.e., the alternative target video encoding bit rate=K_fps·K_pix·K_br·original video encoding bit rate, wherein K_fps represents the ratio between the target video encoding frame rate and the original video encoding frame rate, K_pix represents the ratio between the target video resolution and the original video resolution, K_br represents the predetermined target bit rate decreasing coefficient, and "·" represents a multiplication; and E. selecting the most approximate reference resolution from a predetermined reference correspondence table (see the following Table 1) according to the target video resolution, comparing the reference bit rate corresponding to the selected reference resolution with the alternative target video encoding bit rate, and selecting the smaller bit rate as the target video encoding bit rate required for the compression.

TABLE 1

|  | Resolution | Frame rate(fps) | Bit rate (kbps) |
| --- | --- | --- | --- |
| Reference 1 | 640 × 480 | 15 | 768 |
| Reference 2 | 320 × 240 | 15 | 384 |
| Reference 3 | 160 × 120 | 15 | 128 |

With reference to Table 1, for example the target video resolution is assumed as 320×240, selecting the most approximate reference resolution from Table 1, i.e., 320×240 corresponding to Reference 2 (in this embodiment, the target video resolution is equal to the resolution corresponding to Reference 2, and the equal is just a special condition); next, comparing the bit rate 384 kbps corresponding to Reference 2 with the alternative target video encoding bit rate, and selecting the smaller bit rate as the target video encoding bit rate required for the compression. For example, if the alternative target video encoding bit rate is 360 kbps (less than 384 kbps), selecting 360 kbps (the smaller one) as the target video encoding bit rate required for the compression; if the alternative target video encoding bit rate is 400 kbps (larger than 384 kbps), selecting 384 kbps (the smaller one) as the target video encoding bit rate required for the compression.

In which, the target video encoding frame rate required in the above computation shall be computed according to the following principle:

comparing the original video encoding frame rate with a predetermined threshold value of the video encoding frame rate, and preferably, selecting the predetermined threshold value of the video encoding frame rate to be 15 frame per second (fps); if the original video encoding frame rate is larger than or equal to 15 fps, determining the target video encoding frame rate to be 15 fps; and if the original video encoding frame rate is smaller than 15 fps, determining the target video encoding frame rate to be the same as the original video encoding frame rate (remaining unchanged). This is because too higher a frame rate makes little contribution to the video subjective fluency, while having a negative influence on the transcoding speed and the size of the target file.

The target video resolution required in the above computation shall be computed according to the following principle:

comparing the original video resolution with a predetermined threshold value of the video resolution, and preferably, selecting the predetermined threshold value of the video resolution to be 640×480; if the original video resolution is not higher than 640×480, to determining the target video resolution to be the same as the original video resolution (remaining unchanged); and if the original video resolution is higher than 640×480, decreasing the resolution, and zooming toward 640×480 while maintaining the original picture aspect ratio, so as to obtain the target video resolution. This is because the resolution has a large influence on the transcoding time.

In addition, the target video encoder type required for the compression shall be computed according to the following principle:

when the original video encoder type is Real Media (RM), VC1 or H.264, determining the target video encoder type to be H.264, otherwise (i.e., the original video encoder type is any other type except RM, VC1 and H.264) determining the target video encoder type to be MPEG4. This is because H.264 and MPEG4 are advantageous in the compression efficiency. In which, RM is a video encoding format provided by the REAL company, and VC1 is a video encoding format provided by the Microsoft company.

The audio transcoding parameter required for the compression shall be computed according to the following principle:

determining that the target audio sample rate is the same as the original audio sample rate (remaining unchanged), and the target audio channel number is the same as the original audio channel number (remaining unchanged); determining that the target audio encoder type is the Advanced Audio Coding (AAC);

computing a ratio between the original audio encoding bit rate and the original video encoding bit rate, and judging whether the ratio is larger than a predetermined threshold value (e.g., 1/3); if the ratio is larger than 1/3, lowering the target audio encoding bit rate by one or two levels on the basis of the original audio encoding bit rate; otherwise determining the target audio encoding bit rate to be the same as the original audio encoding bit rate. For example, if the bit rate of 16 KB is taken as one level, lowering the target audio encoding bit rate by two levels (32 KB) on the basis of the original audio encoding bit rate.

Step 103: encoding the original audio stream to output a new compressed audio stream, and encoding the original video stream to output a new compressed video stream, according to the transcoding parameters;

Step 104: synthesizing the new compressed audio stream and the new compressed video stream to create a new media file.

Since the file size mainly depends on the encoding bit rate, the new media file created after the above compression has a size of (Dst_VideoBitrate+Dst_AudioBitrate)/(Src_VideoBitrate+Src_AudioBitrate) times of that of the source file, i.e., the ratio between the size of the created new media file and the size of the source file is (Dst_VideoBitrate+Dst_AudioBitrate)/(Src_VideoBitrate+Src_AudioBitrate).

Figure 2:
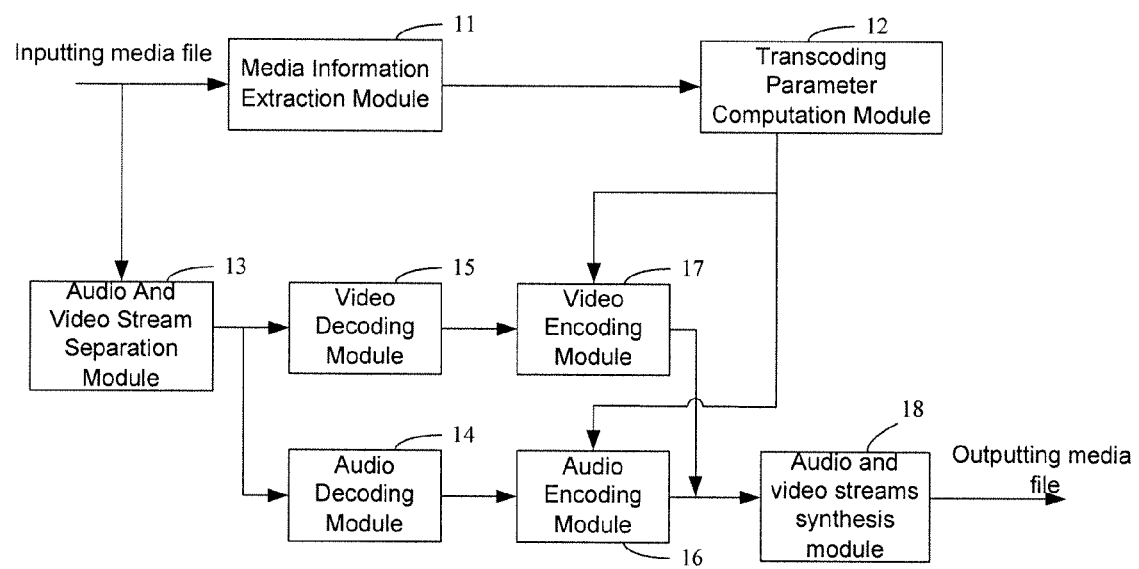
FIG. 2 is a structural diagram of a system for media file compression according to the present invention.

In order to implement the above compression method, the present invention also provides a system for media file compression. As shown in FIG. 2, the system includes: a media information extraction module 11, a transcoding parameter computation module 12, an audio and video stream separation module 13, an audio decoding module 14, a video decoding module 15, an audio encoding module 16, a video encoding module 17, and an audio and video streams synthesis module 18. In which, the media information extraction module 11 is configured to analyze the input media file, extract the encoding parameters of the media file, and provide the encoding parameters to the transcoding parameter computation module 12. The transcoding parameter computation module 12 is configured to generate the transcoding parameters required for the compression according to the analysis of the encoding parameters, and provide the transcoding parameters to the audio encoding module 16 and the video encoding module 17. The audio and video stream separation module 13 is configured to separate the audio and video streams of the input media file to obtain an audio compressed stream and a video compressed stream. The audio decoding module 14 is configured to decode the separated audio compressed stream to obtain the original audio stream. The video decoding module 15 is configured to decode the separated video compressed stream to obtain the original video stream. The audio encoding module 16 is configured to encode the original audio stream according to the transcoding parameters to obtain a new compressed audio stream. The video encoding module 17 is configured to encode the original video stream according to the transcoding parameters to obtain a new compressed video stream. The audio and video streams synthesis module 18 is configured to synthesize the new compressed audio stream with the new compressed video stream to create a new media file.

The principles for analyzing and creating the transcoding parameters have been detailedly described in the above compression method, and herein are omitted.

By means of the encoding compression method and system of the present invention, users can realize simple and rapid compressions of the media files of various formats without understanding media expertise, and the storage space can be saved, so that it is convenient to carry, transfer and share the media files. In addition, by means of the compression provided by the present invention, the subjective quality of the media files can also be ensured.

The above descriptions are just preferred embodiments of the present invention, rather than limitations to the protection scope of the present invention.

What is claimed is:

1. A method for media file compression, comprising:

extracting encoding parameters from an input media file, separating and decoding audio and video streams from the input media file, and extracting an original audio stream and an original video stream;

computing transcoding parameters required for a compression according to the encoding parameters;

encoding the original audio stream to output a new compressed audio stream, and encoding the original video stream to output a new compressed video stream, according to the transcoding parameters; and synthesizing the new compressed audio stream and the new compressed video stream to create a new media file;

wherein the encoding parameter comprises video encoding parameter and audio encoding parameter, wherein the video encoding parameter comprises original video encoder type, original video encoding bit rate, original video encoding frame rate, and original video resolution; and the audio encoding parameter comprises original audio encoder type, original audio encoding bit rate, original audio channel number, and original audio sample rate;

the transcoding parameter comprises video transcoding parameter and audio transcoding parameter, wherein the video transcoding parameter comprises target video encoder type, target video encoding bit rate, target video encoding frame rate, and target video resolution; and the audio transcoding parameter comprises target audio encoder type, target audio encoding bit rate, target audio channel number, and target audio sample rate;

the method further comprises computing the target video encoding frame rate required for the compression;

computing the target video encoding frame rate required for the compression is:

comparing the original video encoding frame rate with a predetermined threshold value of the video encoding frame rate; if the original video encoding frame rate is larger than or equal to the threshold value, determining the target video encoding frame rate to be equal to the threshold value; and if the original video encoding frame rate is smaller than the threshold value, determining the target video encoding frame rate to be the same as the original video encoding frame rate.

2. The method for media file compression according to claim 1, wherein the method further comprises computing the target video encoding bit rate required for the compression;

computing the target video encoding bit rate required for the compression is:

computing a ratio K_fps between the target video encoding frame rate and the original video encoding frame rate, computing a ratio K_pix between the target video resolution and the original video resolution, and obtaining an alternative target video encoding bit rate in an equation of K_fps·K_br·original video encoding bit rate, wherein K_br represents a predetermined target bit rate decreasing coefficient;

selecting a most approximate reference resolution from a predetermined reference correspondence table according to the target video resolution, comparing a reference bit rate corresponding to the selected reference resolution with the alternative target video encoding bit rate, and selecting the smaller bit rate as the target video encoding bit rate required for the compression.

3. The method for media file compression according to claim 1, wherein the method further comprises computing the audio transcoding parameter required for the compression;

computing the audio transcoding parameter required for the compression is:

determining that the target audio sample rate is the same as the original audio sample rate, and the target audio channel number is the same as the original audio channel number; determining that the target audio encoder type is Advanced Audio Coding (AAC);

computing a ratio between the original audio encoding bit rate and the original video encoding bit rate, and judging whether the ratio is larger than a predetermined threshold value; and if yes, lowering the target audio encoding bit rate by one or two levels; otherwise determining the target audio encoding bit rate to be the same as the original audio encoding bit rate.

4. A system for media file compression, comprising:

a media information extraction module configured to extract encoding parameters from an input media file;

a transcoding parameter computation module configured to computer transcoding parameters required for a compression according to the encoding parameters;

an audio and video stream separation module configured to separate audio and video streams from the input media file to obtain an audio compressed stream and a video compressed stream;

an audio decoding module configured to decode the separated audio compressed stream to extract an original audio stream;

a video decoding module configured to decode the separated video compressed stream to extract an original video stream;

an audio encoding module configured to encode the original audio stream according to the transcoding parameters to output a new compressed audio stream;

a video encoding module configured to encode the original video stream according to the transcoding parameters to output a new compressed video stream; and an audio and video streams synthesis module configured to synthesize the new compressed audio stream with the new compressed video stream to create a new media file;

wherein the encoding parameter comprises video encoding parameter and audio encoding parameter, wherein the video encoding parameter comprises original video encoder type, original video encoding bit rate, original video encoding frame rate, and original video resolution; and the audio encoding parameter comprises original audio encoder type, original audio encoding bit rate, original audio channel number, and original audio sample rate;

the transcoding parameter comprises video transcoding parameter and audio transcoding parameter, wherein the video transcoding parameter comprises target video encoder type, target video encoding bit rate, target video encoding frame rate, and target video resolution; and the audio transcoding parameter comprises target audio encoder type, target audio encoding bit rate, target audio channel number, and target audio sample rate;

wherein the transcoding parameter computation module is further configured to compute the target video encoding frame rate required for the compression, computing the target video encoding frame rate required for the compression is:

comparing the original video encoding frame rate with a predetermined threshold value of the video encoding frame rate; if the original video encoding frame rate is larger than or equal to the threshold value, determining the target video encoding frame rate to be equal to the threshold value; and if the original video encoding frame rate is smaller than the threshold value, determining the target video encoding frame rate to be the same as the original video encoding frame rate.

5. The system for media file compression according to claim 4, wherein the transcoding parameter computation module is further configured to compute the target video encoding bit rate for the compression, computing the target video encoding bit rate required for the compression is:

computing a ratio K_fps between the target video encoding frame rate and the original video encoding frame rate, computing a ratio K_pix between the target video resolution and the original video resolution, and obtaining an alternative target video encoding bit rate in an equation of K_fps·K_pix·K_br·original video encoding bit rate, wherein K_br represents a predetermined target bit rate decreasing coefficient;

selecting a most approximate reference resolution from a predetermined reference correspondence table according to the target video resolution, comparing a reference bit rate corresponding to the selected reference resolution with the alternative target video encoding bit rate, and selecting the smaller bit rate as the target video encoding bit rate required for the compression.

* * * * *

UNITED STATES PATENT AND TRADEMARK OFFICE
CERTIFICATE OF CORRECTION

| | |
|---|---|
| PATENT NO. | : 8,761,244 B2 |
| APPLICATION NO. | : 13/500883 |
| DATED | : June 24, 2014 |
| INVENTOR(S) | : Jun Liu et al. |

It is certified that error appears in the above-identified patent and that said Letters Patent is hereby corrected as shown below:

On the Title page:

Item (75) Inventors should read:     Jun Liu, Shenzhen City (CN); Jingchang Chen, Shenzhen City (CN); Xinliang Wang, Shenzhen City (CN)

Item (73) Assignee should read:     Tencent Technology (Shenzhen) Company Limited, Shenzhen City (CN)

In the Claims:

At column 9, claim number 2, lines 26-27, the equation should be amended to read as follows:

in an equation of $K\_fps \cdot K\_pix \cdot K\_br \cdot$ original video encoding bit rate Signed and Sealed this
Fifteenth Day of September, 2015

Michelle K. Lee
*Director of the United States Patent and Trademark Office*